No. 859,292. PATENTED JULY 9, 1907.
J. HÄRDEN.
ELECTRIC LIGHTING.
APPLICATION FILED DEC. 10, 1903.
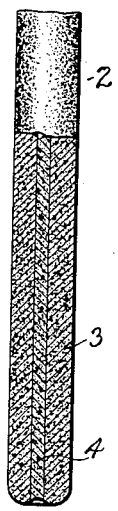
Witnesses:
George A. Thornton
Helen Oxford
Inventor:
Johannes Härdén,
by Albert H. Davis
Att'y.

UNITED STATES PATENT OFFICE.

JOHANNES HÄRDÉN, OF SCHENECTADY, NEW YORK, ASSIGNOR TO GENERAL ELECTRIC COMPANY, A CORPORATION OF NEW YORK.

ELECTRIC LIGHTING.

No. 859,292.   Specification of Letters Patent.   Patented July 9, 1907.

Application filed December 10, 1903. Serial No. 184,564.

*To all whom it may concern:*

Be it known that I, JOHANNES HÄRDÉN, a subject of the King of Sweden and Norway, residing at Schenectady, county of Schenectady, and State of New York, have invented certain new and useful Improvements in Electric Lighting, of which the following is a specification.

The object of my present invention is to improve the operation and increase the efficiency of arc lamps.
It has heretofore been found that electrodes containing or composed of certain substances other than carbon such as titanium or its compounds are highly efficient sources of light as they give a luminous arc which yields an intense white light. Difficulty has heretofore been experienced, however, in the use of electrodes formed of these materials in alternating current lamps employing moderate electromotive forces and current strengths. This is due I believe to the fact that these materials are non-arcing. By non-arcing materials I mean materials which cannot maintain a steady alternating current arc with current and voltage strengths of magnitudes which insure a steady arc where direct current is employed. I have found that such electrodes can be successfully employed in alternating current lamps if means are provided for properly introducing into the arc certain substances such as carbon, salts of halogens and of the light earths or the like which will maintain an alternating current having the same voltage and current characteristics as a direct current arc maintained therefrom.

It is desirable that the arcing materials introduced shall not have the effect of appreciably lowering the melting point of the electrodes, as where the melting point of electrodes is lowered far enough to allow the formation of a pool of melting material at the electrode tip, an unsymmetrical flow of current is apt to occur.

I have found an advantageous way of carrying out my invention to consist in employing an electrode composed essentially of a non-arcing material, such as a titanium compound or the like, in combination with a second electrode composed principally of a suitable arcing material such as carbon. The first electrode may have a comparatively small percentage of some arcing material such as carbon mixed with the non-arcing material, and the second electrode may consist of a shell of arcing material such as carbon and a comparatively small core composed principally of non-arcing material.

The difficulty which has heretofore been experienced in the operation of electrodes containing titanium compounds or the like in alternating current arc lamps has been due, I believe, to the fact that during the intervals in which the strength of the alternating current is low the arc path, which is filled with vaporous compounds, cools to a point which greatly decreases its conductivity; this necessitates a high electromotive force to bring the current again up to its normal maximum. The carbon or other materials which I add to the arc act, I believe, to maintain the conductivity of the arc path.

For a better understanding of my invention reference may be had to the accompanying drawing and detailed description in which I have disclosed one embodiment of my invention.

The drawing is an elevation, partly in section, showing a pair of electrodes between which an arc is maintained by alternating current.

The lower electrode 1 is formed largely, or wholly, of titanium or its compounds. Preferably I employ in its formation a mixture containing titanium carbid and carbon in the proportion of about 90 parts of titanium carbid to about 10 parts of carbon. The titanium carbid is ordinarily formed from rutile, by reducing in an electric furnace. I find it desirable to free the carbid thus formed from iron and generally from silicates which it may contain. The presence of iron in the electrode has a tendency to reduce its melting point. This may result in the formation of a pool of melted material at the tip of the electrode which interferes with the proper operation of the alternating current arc. Silicates usually form slags which are apt to interfere in various ways with the proper operation of the arc. I find, however, that the presence of a small quantity of aluminium silicate in the electrode is not undesirable, as it seems to steady the arc while producing but little, if any, injurious consequences. From a plastic mass containing an intimate mixture of titanium carbid and carbon to which preferably is added a small amount of a suitable binder such as linseed oil or tar, the electrode is molded, pressed or otherwise formed. The electrode thus formed is heated first in a muffle furnace in which the temperature is about 900° C., and then in a carbon tube electric furnace in which the temperature is brought up to about 1800° C. After being gradually cooled the electrode is preferably copper plated and is then ready for use.

The upper electrode 2 comprises preferably a shell 3 of carbon and the filling or core 4. The core 4 may be formed of a mixture of titanium carbid and carbon above specified, to which a small quantity of a suitable binder, such as water glass, mastic or the like, is added. The core or filling may be inserted in the shell in any suitable manner. In practice I prefer to squirt or press the core into the shell while the material composing the core is in a plastic condition. After the core is placed in the shell the whole electrode is heated to a temperature of about 400° or 500° C. in a drying oven. The presence of the binder in the core is desirable as it insures a good mechanical connection between the core and the shell. The core containing titanium carbid is not essential in all cases, but is desirable as it insures the possession by the arc at all times of the characteristic features of the titanium arc. The electrodes thus formed, when connected to a proper source of alternating current, give, with a moderate voltage, a luminous arc yielding a large amount of light of good color. The titanium carbid formed in the manner hereinbefore described may contain other compounds of titanium such, for instance, as the oxid, or it may contain some metallic titanium. These substances, however, are not seriously, if at all, objectionable.

The composition of the electrode 1 may be varied somewhat from that given above and certain other substances may be added to those there specified.
In particular I have found that electrodes formed from a mixture containing about 75 parts of titanium carbid, 10 parts of carbon, 3 parts of ammonium chlorid, 2 parts of magnesium phosphate and 10 parts of liquid tar, which acts as a binder, give very satisfactory results. In the process of baking and firing the electrodes the liquid tar is converted into carbon, and as some of the carbon in the mixture burns away the percentage of carbon in the completed electrode formed from this mixture is about 12 per cent. Small amounts of ammonium chlorid and magnesium phosphate may be employed in the core of the electrode 2 if desired.

I am aware that it has heretofore been proposed to place in one or both of the carbon electrodes between which an alternating current is maintained, certain so-called light-producing salts, such as those of lime and magnesia, in order that the arc between the electrodes may be colored. In such cases however the salts are merely evaporated into the arc by the heat produced. The arc is essentially a carbon arc colored by these substances. My present invention is to be clearly distinguished from such cases, as the titanium carbid or the like used by me is a conducting compound which is ionized by the current. The ionized vapor thus formed serves as the principal gaseous medium through which current between the electrodes passes.

The electrodes which I have hereinbefore described may be advantageously employed in the lamp mechanism shown in my application for patent on arc lamps, Serial No. 184,876, filed on the 12th day of December, 1903, although it is not essential that they be employed in any particular form of lamp.

What I claim as new and desire to secure by Letters Patent of the United States, is:

1. In combination for use in an alternating current arc lamp, an electrode composed principally of some non-arcing material which gives a luminous or flaming arc, and an electrode composed principally of arcing material and containing some substance which gives a luminous or flaming arc.

2. In combination for use in an alternating current arc lamp, an electrode containing a predominating amount of titanic material, and an electrode composed principally of carbon.

3. In combination for use in an alternating current arc lamp, an electrode containing a predominating amount of titanium carbid, and an electrode composed principally of carbon.

4. In combination for use in an alternating current arc lamp, an electrode containing a large proportion of titanic material, and a second electrode composed principally of carbon, but containing some titanic material.

5. In combination for use in an alternating current arc lamp, a pair of electrodes, one of said electrodes being formed of a homogeneous mixture of carbon and titanium carbid and the other of said electrodes consisting of a core part and a shell part, one of said parts being composed principally of carbon and the other of said parts being composed principally of titanium carbid.

6. In combination for use in an alternating current arc lamp, an electrode containing a large proportion of titanium carbid and a small proportion of carbon, and a second electrode containing a large proportion of carbon and a small proportion of titanium carbid.

7. In combination for use in an alternating current arc lamp, an electrode composed principally of a chemical compound of titanium, and a second electrode composed principally of carbon but containing some titanic material.

8. In combination for use in an alternating current arc lamp, an electrode composed principally of carbon, and an electrode composed principally of titanium carbid but containing small quantities of carbon, ammonium chlorid and magnesium phosphate.

9. An electrode for use in alternating current lamps, consisting of a conducting substance which gives a luminous arc but is non-arcing with alternating current, with the addition of a substance able to maintain an alternating arc in a percentage great enough to make the electrode operate with alternating current.

10. In combination for use in an alternating current arc lamp, a pair of electrodes, one of said electrodes being formed of a homogeneous mixture of carbon and titanium carbid, and the other of said electrodes comprising a shell of carbon and a core containing titanium carbid.

11. In combination for use in an alternating current arc lamp, an electrode comprising a shell of carbon and a core containing titanium carbid, and a second electrode composed principally of a mixture of titanium carbid and carbon.

In witness whereof, I have hereunto set my hand this third day of December, 1903.

JOHANNES HÄRDÉN.

Witnesses:
BENJAMIN B. HULL,
BURTON C. ANTHONY.